United States Patent
Gouaillier

(10) Patent No.: US 9,429,948 B2
(45) Date of Patent: Aug. 30, 2016

(54) HUMANOID ROBOT HAVING FALL-MANAGEMENT CAPABILITIES, AND METHOD FOR MANAGING SAID FALLS

(75) Inventor: David Gouaillier, Montrouge (FR)

(73) Assignee: ALDEBARAN ROBOTICS, Paris (FR)

( * ) Notice: Subject to any disclaimer, the term of this patent is extended or adjusted under 35 U.S.C. 154(b) by 0 days.

(21) Appl. No.: 13/819,345

(22) PCT Filed: Aug. 11, 2011

(86) PCT No.: PCT/EP2011/063801
§ 371 (c)(1),
(2), (4) Date: May 10, 2013

(87) PCT Pub. No.: WO2012/025387
PCT Pub. Date: Mar. 1, 2012

(65) Prior Publication Data
US 2013/0231822 A1    Sep. 5, 2013

(30) Foreign Application Priority Data

Aug. 27, 2010  (FR) ...................................... 10 56798

(51) Int. Cl.
*G05D 1/02* (2006.01)
*B62D 57/032* (2006.01)
*G06F 11/30* (2006.01)

(52) U.S. Cl.
CPC ............. *G05D 1/021* (2013.01); *B62D 57/032* (2013.01); *G06F 11/30* (2013.01); *Y10S 901/01* (2013.01)

(58) Field of Classification Search
CPC ................................ G06F 19/00; G05B 19/04
USPC ............................. 700/245, 255; 318/568.12
See application file for complete search history.

(56) References Cited

U.S. PATENT DOCUMENTS

| 4,541,771 A * | 9/1985 | Beni et al. ..................... 414/730 |
| 2004/0176875 A1* | 9/2004 | Iribe et al. ..................... 700/245 |
| 2004/0236469 A1* | 11/2004 | Moridaira et al. ............ 700/245 |

(Continued)

FOREIGN PATENT DOCUMENTS

| CN | 1518488 A | 8/2004 |
| WO | 2009/124951 A2 | 10/2009 |
| WO | 2009/124955 A2 | 10/2009 |

OTHER PUBLICATIONS

Fujiwara et al. 2003 IEEE/RSJ Intl. Conference on Intelligent Robots and Systems "The First Human-size Humanoid that can fall over Safely and Stand-up Again", pp. 1920-1926, Oct. 2003.*
Kiyoshi Fujiwara, et al., "UKEMI: Falling Motion Control to Minimize Damage to Biped Humanoid Robot", Proceedings of the 2002 IEEE/RSJ International Conference on Intelligent Robots and Systems, Sep. 20, 2002, pp. 2521-2526, vol. 3, XP010609471.

*Primary Examiner* — John R Olszewski
*Assistant Examiner* — Jason Roberson
(74) *Attorney, Agent, or Firm* — Baker and Hostetler LLP

(57) ABSTRACT

The invention relates to a humanoid robot endowed with particular capabilities for managing falls. The risks of falling limit the development of the mass-market use of humanoid robots. In the prior art, the modalities for detecting falls are not well suited to the case of very dynamic robots since the center of mass is very often outside their support polygons. The modalities for managing falls are also poorly suited to robots which must be economical in their computation resources. According to the invention, the conventional support polygon is supplemented with effectors for which it is determined that they are sufficiently close to the ground. Protection strategies are implemented, chosen from a set of strategies defined by a classification of the angles of fall.

15 Claims, 12 Drawing Sheets

(56) References Cited

U.S. PATENT DOCUMENTS

| | | |
|---|---|---|
| 2005/0234593 A1 | 10/2005 | Goswami et al. |
| 2007/0016329 A1 | 1/2007 | Herr et al. |
| 2010/0161126 A1* | 6/2010 | Goswami et al. ............ 700/255 |
| 2011/0029128 A1 | 2/2011 | Serre et al. |

* cited by examiner

HUMANOID ROBOT HAVING FALL-MANAGEMENT CAPABILITIES, AND METHOD FOR MANAGING SAID FALLS

CROSS-REFERENCE TO RELATED APPLICATION

This application claims priority of PCT Application No. PCT/EP2011/063801 filed Aug. 11, 2011 and claims foreign priority to French patent application No. 10 056798, filed on Aug. 27, 2010, the disclosure of which are hereby incorporated by reference in their entirety.

FIELD OF THE INVENTION

The present invention belongs to the field of humanoid robots. More precisely, it applies to the management of the falls of said robot, these being a particularly penalizing event for the development of the uses of these robots.

BACKGROUND

A robot can be described as humanoid when it possesses certain attributes of the appearance and functionalities of man: a head, a trunk, two arms, two hands, two legs, two feet, etc. Beyond appearance, the functions that a humanoid robot is capable of fulfilling will depend on its ability to perform movements, to speak and to "reason". Humanoid robots are capable of walking, of making gestures, with the limbs or with the head. The complexity of the gestures that they are capable of performing is ever increasing. However, robots remain fragile, notably on account of the motors of their articulations. This fragility is a significant handicap for the development of mass-market applications. Indeed, within the context of these applications, it is particularly deleterious to have to cope with breakages or faults due to repeated falls since it would be necessary for producers and distributors of humanoid robots to deploy an after-sales service of disproportionate significance to the initial sales, and at an unacceptable cost to the public at large.

A first strategy applicable to humanoid robots endowed with a walking capability for minimizing the risks of falls is to ensure that said walking is sufficiently stable. A widely used means for doing this is to adjust the trajectory of the robot in such way that the Zero Moment Point (ZMP) (i.e. the point on the ground where the moment of the bearing axis and the moment of the azimuth axis are zero) is included in the robot's support polygon (i.e. in the case of a walking robot, if the latter is standing on one foot, the support polygon will have the shape of this foot. If it is standing on its two feet, the area of this polygon will be that of the two feet, plus the interpodal area.) This strategy is however not sufficient to ensure stability of the robot under all conditions, notably in cases where the robot has to advance over an uneven terrain, perform movements which place it at a limit of equilibrium or sustain knocks caused by third parties.

Conventional solutions to this problem use common principles comprising verifying that the projection of the center of mass of the robot on the surface of advancement remains included in the support polygon for the robot and then, in the case of exiting of said center of mass from said polygon, to determine the best fall posture as a function of the angle of exit of said polygon. These solutions operate correctly in the simple case of a static robot endowed with sensors making it possible to decide without ambiguity that the robot is in a fall position. The same does not hold in the case of robots while walking, notably when said fall detection sensors may confuse a normal gesture included in the walking trajectory and the onset of a fall. Indeed, in this case, mechanisms for protecting against falls will be triggered inappropriately whereas there is no reason to interrupt the normal course of the robot's activities.

SUMMARY OF THE INVENTION

The present invention solves this problem by affording means making it possible to discriminate in a more precise manner the cases where it is really necessary to implement appropriate mechanisms for protecting the robot against falls. This discrimination is effected by defining a virtual support polygon, derived from the physical polygon by adding to it points which are almost in contact with the surface of advancement.

For this purpose, the present invention discloses a humanoid robot capable of moving on a surface comprising at least one module for detecting the contact of at least one first extremity of the robot with said surface and a module for computing a position of a point of projection of a center of mass of said robot with respect to a first support polygon comprising at least said at least one first extremity, said robot further comprising at least a module for detecting a proximity of at least one second extremity of said robot with said surface, and wherein said module for computing the position of the point of projection of the center of mass of said robot with respect to the first support polygon is further configured to compute the position of the projection of the center of mass of said robot with respect to a second support polygon, said second polygon being deduced from the first polygon by adding to the latter points of projection on said surface of said second at least one extremity of said robot belonging to a group of extremities of said robot detected as in near-contact with said surface.

Advantageously, the module for detecting the proximity of said at least one second extremity with said surface receives as input the position of said at least one second extremity with respect to said surface, said position being provided as output of a geometric model of the robot comprising at least the position in space of said extremity in a reference frame of the robot.

Advantageously, the condition according to which a second extremity of the robot is in near-contact with said surface is characterized by a distance threshold chosen as a function of criteria belonging to a group of criteria comprising at least the size of the robot and the maximum swing in height of its lower limbs.

Advantageously, said at least one first extremity is one of the robot's feet, said foot comprising at least one pressure force sensor.

Advantageously, said at least one second extremity is one of the robot's hands.

Advantageously, the robot of the invention furthermore comprises, as input of said module for computing the position of the point of projection of the center of mass of said robot with respect to a support polygon, a module for filtering the robot's postures by comparing according to a predefined criterion a distance between geometric models of said postures and the geometric models of reference postures.

Advantageously, the robot of the invention furthermore comprises an inertia measurement unit providing the module for computing the position of the point of projection of the center of mass of said robot with a vertical axis whose angle with the axis connecting the thorax and one of the robot's feet in contact with the ground and with an angle of rotation to be applied to the axis of projection of the center of mass of the robot.

Advantageously, the robot of the invention furthermore comprises, at an output of said module for computing the position of the point of projection of the center of mass of said robot with respect to a support polygon, a module for monitoring a group of actions for protecting against falls, at least one of said actions being triggered when said computation module provides at least one output characteristic of a fall state of the robot in which the point of the projection of its center of mass is outside the second support polygon.

Advantageously, the group of protection actions comprises at least the disabling of the slaving of the articulations of the legs of the robot, the placing in a posture of protection of at least one element belonging to the group comprising at least the head, the arms and the pelvis, and the disabling of the articulations of at least one element belonging to said group.

Advantageously, said computation module furthermore provides the module for monitoring the group of actions for protecting against falls, for a state characterizing a fall state of the robot, with an angle characterizing a direction of fall in a reference frame of the robot, the value of said angle of fall with respect to chosen reference values determining the choice of the protection actions in the group of actions for protecting against falls to be executed.

Advantageously, when an angle of fall determines a forward fall, the placing in a posture of protection of the head includes placing it substantially rearward, the placing in a posture of protection of the arms includes placing them substantially forward and the placing in a posture of protection of the pelvis includes closing the pelvis.

Advantageously, when an angle of fall determines a fall to the left or the right, the placing in a posture of protection of the head includes placing the head substantially forward, the placing in a posture of protection of the arms includes grouping the arms together substantially toward the body and the placing in a posture of protection of the pelvis includes opening the pelvis.

Advantageously, when the angle of fall determines a rearward fall, the placing in a posture of protection of the head includes placing the head substantially forward, the placing in a posture of protection of the arms includes bringing the arms substantially rearward and the placing in a posture of protection of the pelvis includes closing the pelvis.

The invention also discloses a method for managing the falls of a humanoid robot capable of moving on a surface and comprising at least one module for detecting the contact of at least one first extremity of the robot with said surface, said method comprising a step of computing the position of the point of projection of a center of mass of said robot with respect to a first support polygon comprising at least said at least one first extremity, said method further comprising at least one step of detecting a proximity of at least one second extremity of said robot with said surface and a step of computing a position of a projection of the center of mass of said robot with respect to a second support polygon, said second polygon being deduced from the first polygon by adding to the latter points of projection on said surface of said at least one second extremity of said robot belonging to a group of extremities of said robot detected as in near-contact with said surface.

The invention also discloses a computer program comprising program code instructions configured for allowing execution of the method as claimed in claim 14 when the program is executed on a computer, said program being adapted for allowing the management of falls of a humanoid robot capable of moving on a surface and comprising at least one module for detecting the contact of at least one first extremity of the robot with said surface, said program comprising a module for computing the position of a point of projection of a center of mass of said robot with respect to a first support polygon, said computer program further comprising at least one input module for detection data of a proximity of at least one second extremity of said robot with said surface and a module for computing a position of projection of the center of mass of said robot with respect to a second support polygon, said second polygon being deduced from the first polygon by adding to the latter points of projection on said surface of said at least one second extremity of said robot belonging to a group of extremities of said robot detected as in near-contact with said surface.

The algorithm of the invention furthermore presents the advantage of using only equations of first degree and consequently of being much less greedy in terms of computation resources at the fall detection stage than the prior art solutions.

The solution can advantageously be combined with a prior filtering of the acceptable postures which could be wrongly considered to be fall postures, thereby further increasing the computational effectiveness of the invention.

Furthermore, according to the invention, in the case of detecting a fall situation, a protection solution chosen as a function of particularly simple criteria will be implemented, this simplicity also leading to a computational effectiveness which is indispensable in the case of multifunction humanoid robots which must be able to keep resources available for accomplishing all these functions. It is also noted that the modes of fall management of the invention combine particularly well with the modes of managing faults (motor faults, electrical faults, etc.) in which the robots must be placed in a protection position.

BRIEF DESCRIPTION OF THE DRAWINGS

The invention will be better understood and its various characteristics and advantages will emerge from the description which follows of several exemplary embodiments and its appended figures whereof.

DETAILED DESCRIPTION

FIGS. 1a, 1b, 1c, 1d, 1e and 1f illustrate the computation principle for predicting the falls of a robot according to the prior art.

The stability of a solid placed on the ground is conventionally determined by the position of the projection of its center of mass on the ground with respect to its support polygon on the ground.

Figure 1A:
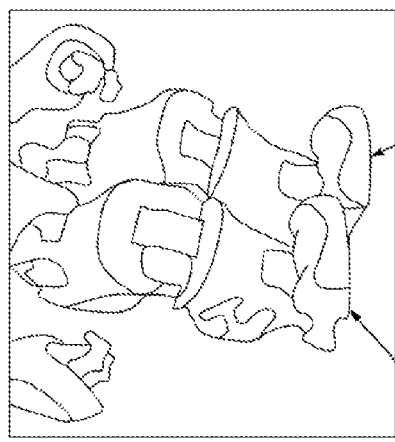
FIGS. 1a, 1b, 1c, 1d, 1e and 1f illustrate the computation principle for predicting the falls of a robot according to the prior art.
Figure 1C:
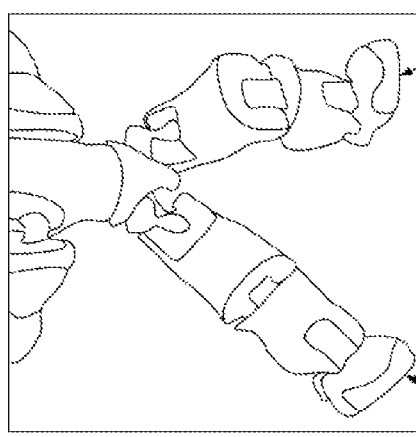
Figure 1E:
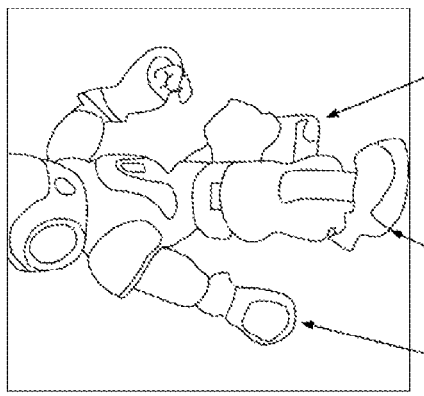
Figure 1B:

In the case of a humanoid robot endowed with feet standing upright, as illustrated by FIGS. 1a, 1c and 1e, the support polygon is determined by the union of the areas of the soles of the feet and of the interpodal area. The support polygons corresponding to the robot's postures illustrated in FIGS. 1a, 1c and 1e are respectively illustrated by FIGS. 1b, 1d and 1f. In these three cases, characterized by the fact that one of the robot's feet is not in complete contact with the surface of advancement of the robot, is illustrated one of the problems of the prior art solution: the support polygon is reduced to the surface of the sole of one of the robot's feet, the second foot being in motion. In the case of FIGS. 1a and 1b, the robot is walking: the foot 110a is placed on the ground but the foot 120a is aloft before being placed back on the ground. If the position of the feet with respect to the ground is conventionally determined by pressure sensors positioned on the sole of the robot's feet, the support polygon, 110b, is reduced to the sole of the foot 110a, which alone is in contact with the ground. Walking is a dynamic phenomenon which guarantees that the ZMP is always in the robot's support polygon, but walking does not guarantee that the center of mass is in said polygon. For example, the center of mass of the robot may be projected at the point, 120b, which is situated outside the polygon 110b. If the detection of a fall is simply slaved to the relative positioning of the point 120b outside the polygon 110b, the fall management mechanism might be triggered at each stride and the robot will not be able to walk.

The projection of the center of mass 120d, 120f will also be outside the support polygon 110d, 110f in the cases illustrated by FIGS. 1c, 1d, 1e and 1f. Indeed, in these cases, the robot has a posture in which one of the feet 120c is not in contact with the ground and the pressure sensors of this foot deliver an information item of absence of contact with the ground, since not all the sensors are in contact with the ground, even if the foot is partially in contact, and this will trigger a fall detection.

Figure 1D:
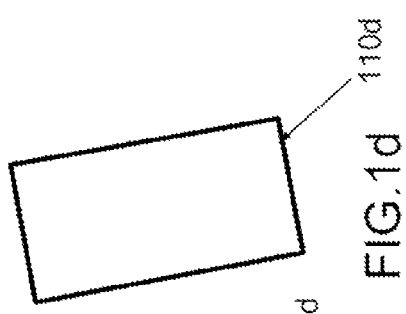
Figure 1F:
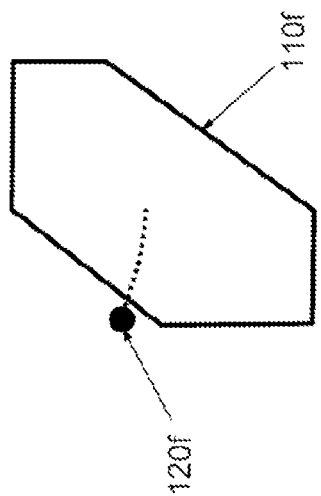

In the case illustrated in FIGS. 1e and 1f, NAO is about to sit down. Both feet are indeed in contact with the ground and the robot will tip/fall rearward but this fall is intentional and its right hand, 130e, will break this fall and guarantee that the robot does not fall completely. In these three cases therefore, a fall detection will be triggered inappropriately.

The present invention solves this drawback of the prior art.

Figure 2:
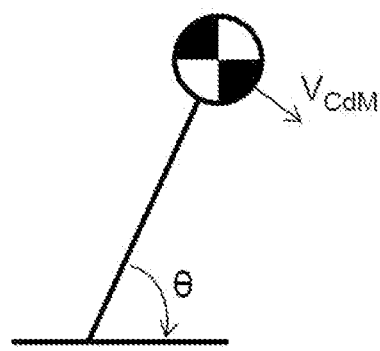
FIG. 2 is a basic diagram of the computation of a mode of managing the falls of a robot according to the prior art.

FIG. 2 is a basic diagram of the computation of a mode of managing the falls of a robot according to the prior art.

According to the prior art, once a fall condition is detected according to the principle described hereinabove in the commentary to FIGS. 1a to 1f, fall management strategies are implemented with the aim of minimizing possible damage to the robot, notably by protecting its sensitive parts, which may differ according to its structure.

Fall management mechanisms of the prior art are described in Fujiwara et al, "Falling Motion Control to Minimize Damage to Biped Humanoid Robot" and "The First Human-size Humanoid that can Fall Over Safely and Stand-up Again", Proceedings of the IEEE/RSJ, Intl. Conference on Intelligent Robots and Systems, EPFL, Lausanne, Switzerland, October 2002 and Las Vegas, Nev., October 2003. These mechanisms use the measurements of the inclination θ of the vertical axis of the robot with respect to the vertical with respect to the ground and of the speed $V_{CdM}$ of the center of mass of the robot to predict the part of the robot which will touch the ground first. These measurements are performed in a dynamic manner by modeling the movements of the robot as an inverse pendulum oscillating with respect to the vertical to the ground. The computations to be performed are particularly greedy in terms of computation power, thereby limiting the possibility of using them in robots whose computational capabilities are assigned in a privileged manner either to permanent tasks, such as managing the movements of the articulations and environment sensors, or to usage tasks, such as managing speech and behaviors.

The present invention makes it possible to circumvent this limitation.

Figure 3:
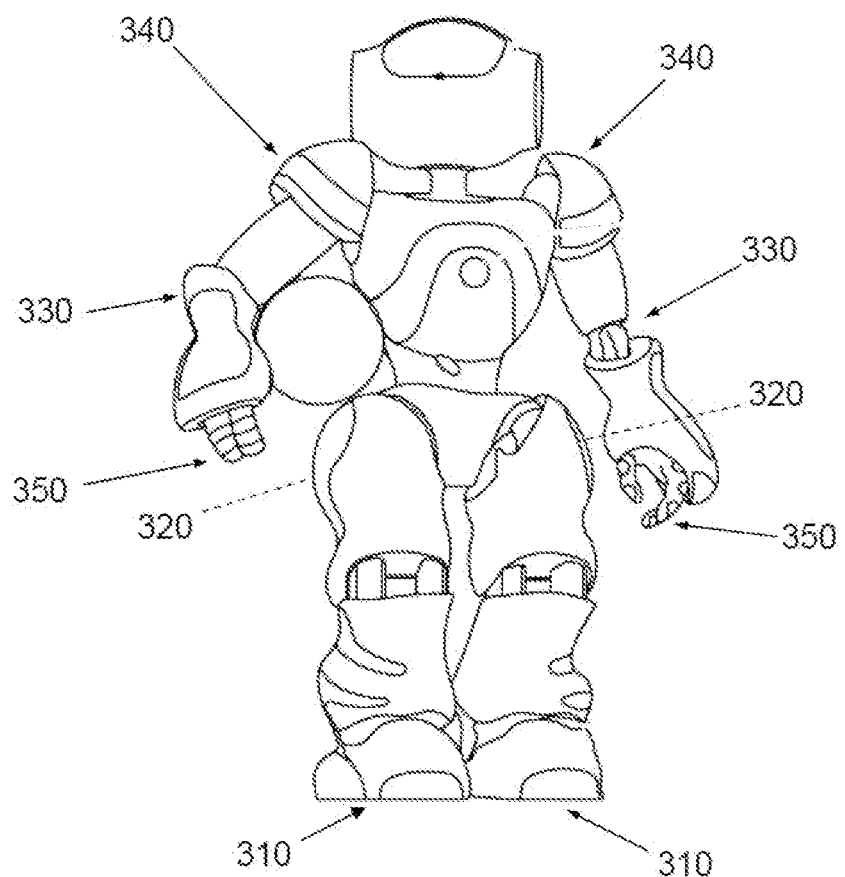
FIG. 3 is a diagram illustrating the positioning of sensors of contact with the ground of parts of the body of a humanoid robot in several embodiments of the invention.

FIG. 3 illustrates the physical architecture of a humanoid robot in an embodiment of the invention. Such a robot has been disclosed notably in patent application WO2009/124951 published on Oct. 15, 2009. This platform has served as the basis for the improvements which have led to the present invention. In the subsequent description, this humanoid robot can be referred to either by this generic term or by its trademark NAO™, without the generality of the reference being modified thereby.

This robot comprises about two dozen electronic cards for controlling sensors and actuators which pilot the articulations. An articulation normally has at least two degrees of freedom and therefore two motors. Each motor is piloted in terms of angle. The articulation also comprises several position sensors, notably MREs (Magnetic Rotary Encoders). The electronic control card comprises an off-the-shelf microcontroller. This may be for example a DSPIC™ from the company Microchip. It is a 16-bit MCU coupled to a DSP. This MCU has a looped slaving cycle of one ms. The robot can also comprise other types of actuators, notably LEDs (Light-emitting diodes) whose color and intensity can convey the emotions of the robot. The latter can also comprise other types of position sensors, notably an inertia measurement unit, FSRs (Ground pressure sensors). These FSRs, 310, are particularly useful for the implementation of the present invention. They are intended within this context to detect the contact of each of the feet with the ground or any other surface of advancement of the robot. With this aim it is possible to use, for example, FlexiForce™ sensors from the company TEKSCAN™ which include a tape with at least two layers of piezo-resistive flexible material. The electrical resistance of the tape decreases as a function of the vertical pressure force applied to the surface on which the tape is disposed. Measurement of the current makes it possible to determine the pressure force after calibration. Several sensors, for example four, are advantageously envisaged on the sole of each foot.

The head comprises the robot's intelligence, notably the card which executes the high-level functions which allow the robot to accomplish the jobs assigned to it. The processor of the card can be an off-the-shelf x86 processor. A low-consumption processor such as the Geode™ from the company AMD (32 bits, 500 MHz) will be chosen in a privileged manner. The card also comprises a set of RAM and flash memories. This card also manages the communications of the robot with the outside (behaviors server, other robots, etc.), normally on a WiFi, WiMax transmission layer, optionally on a public network for mobile data communications with standard protocols optionally encapsulated in a VPN. The processor is normally piloted by a standard OS thereby making it possible to use the usual high-level languages (C, C++, Python, etc.) or the specific languages for artificial intelligence such as URBI (specialized programming language for robotics) for programming the high-level functions.

Another card is housed in the robot's trunk. It is there that the computer which ensures the transmission to the cards for controlling the articulations of the orders computed by the card of the head is situated. The computer of this card is also an off-the-shelf processor. This can advantageously be a 32-bit processor of the ARM 9™ type clocked at 100 MHz. The type of the processor, its central position, close to the on/off button, its link to the control of the power supply make it a tool that is well suited to the management of the robot's power supply (standby mode, emergency stop, etc.). The card also comprises a set of RAM and flash memories.

As explained hereinbelow in the commentary to FIG. 4, it is possible to compute the position of characteristic points of the robot, called effectors, in a reference frame of the robot. These effectors can for example be points of the posterior of the robot, 320, the articulations of the elbows, 330, the articulations of the shoulders, 340, or the articulations of the fingers, 350. Therefore, the computations of this direct geometric model can be used as a means for detecting the proximity to the ground of said effectors, by choosing a threshold as a function of the morphology of the robot.

Figure 4:
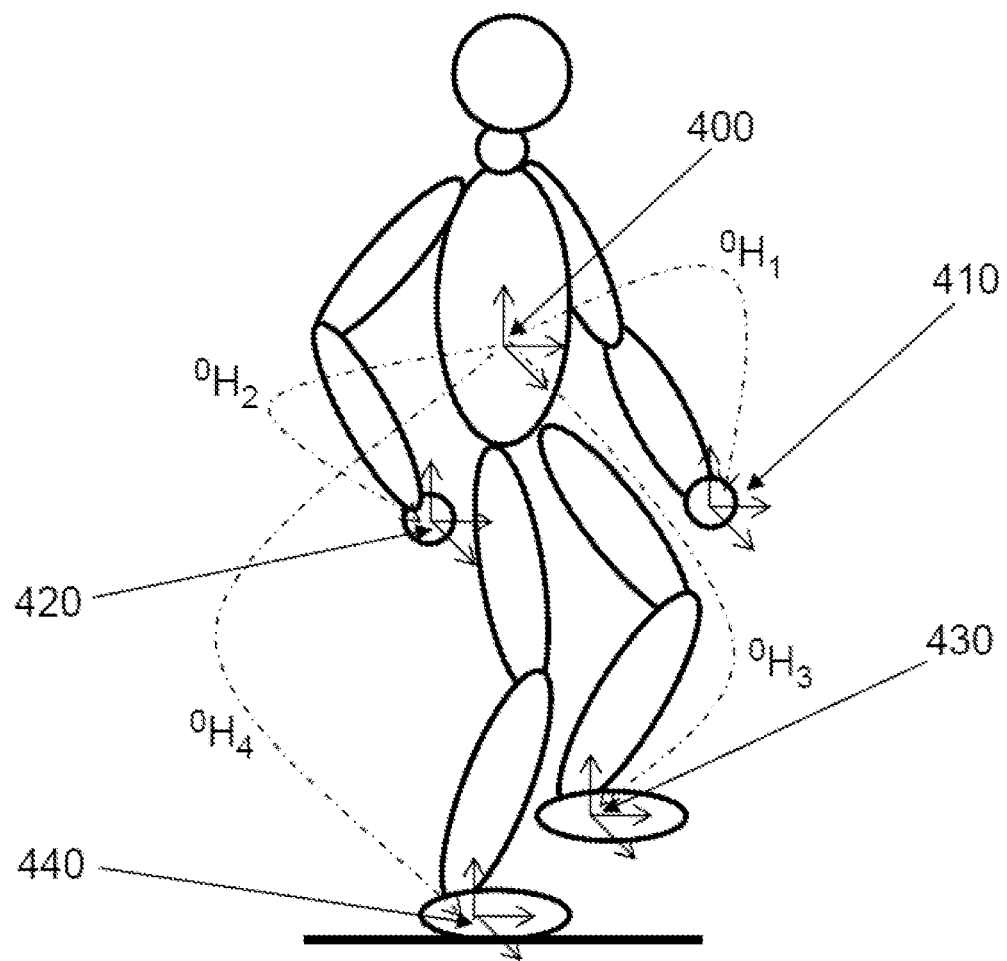
FIG. 4 illustrates a direct geometric model used to compute the position in several reference frames of the robot of characteristic points of the robot in several embodiments of the invention.

FIG. 4 illustrates a direct geometric model used to compute the position in several reference frames of the robot of characteristic points of the robot in several embodiments of the invention.

At a given instant, the angles of each of the articulations of the robot are known to the central system of the robot. Consequently, the relative position of each articulation with respect to all the others can easily be computed, since it in fact entails an articulated chain, all of whose degrees of freedom are determined and known. To easily compute the position of a point b in the reference frame of another point a, use is made of matrices of size 4×4 termed homogeneous transformation matrices of the type $^{a}H_{b}$ which are composed of a rotation matrix of size 3×3 and of a translation matrix of size 3×1. Homogeneous transformation matrices have in particular the following properties:

They are invertible, and aHb −1 is equal to bHa;

$$aHb \times bHc = aHc$$

The reference frame of the torso, 400, is generally used as main reference frame of the robot. The positions of the left and right hands (respectively 410, 420) and of the left and right feet (respectively 430, 440) in this reference frame are given by the matrices $^{0}H_{1}$, $^{0}H_{2}$, $^{0}H_{3}$, $^{0}H_{4}$. The angles of rotation are given by the angles of the motors of the articulations and the translation distances by the inter-articulation distances.

To compute the position of the left hand 410 with respect to the ground, that is to say in the configuration of FIG. 4, with respect to the right foot 440, it is therefore necessary to compute the matrix $^{4}H_{1}$. By applying the above formulae, it is deduced by a matrix inversion and a matrix multiplication that:

$$^{4}H_{1} = {^{0}H_{4}}^{-1} \times {^{0}H_{1}}.$$

This scheme can be used to compute the position of any point of the robot in an absolute reference frame, in particular of any effector such as those positioned in FIG. 3 with the references 320 (buttocks), 330 (elbows), 340 (shoulders) and 350 (fingers).

Figure 5:
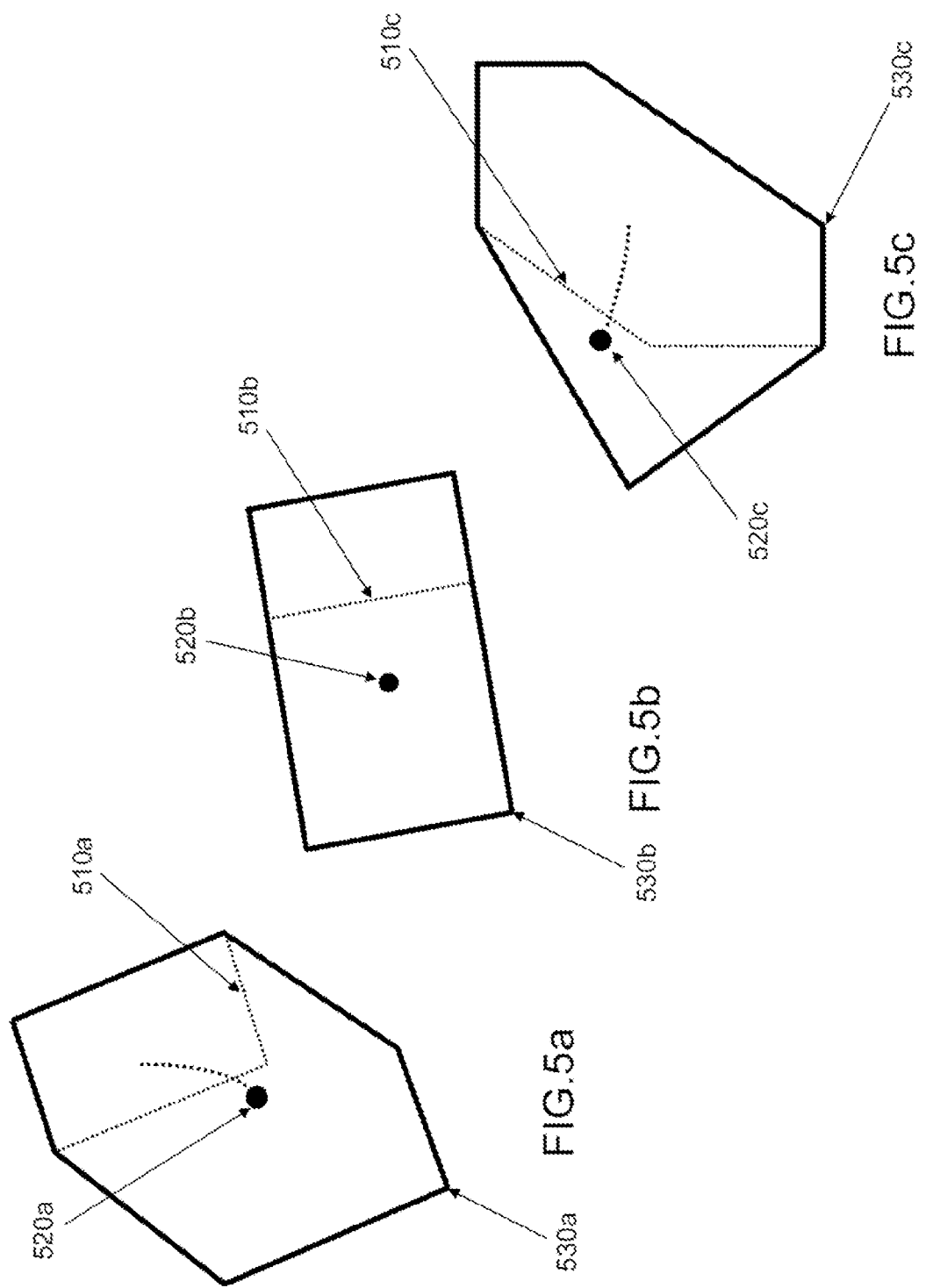
FIGS. 5a, 5b and 5c illustrate the computation principle for predicting the falls of a robot in several embodiments of the invention.

FIGS. 5a, 5b and 5c illustrate the computation principle for predicting the falls of a robot in several embodiments of the invention.

The principle of the invention comprises computing a virtual or projected support polygon taking account of effectors close to the ground which will therefore normally be able to ensure the stability of the robot.

The polygons 510a, 510b and 510c correspond respectively to the polygons 110b, 110d and 110f of FIGS. 1b, 1d and 1f. By the means explained hereinbelow in the commentary to FIG. 6, it is determined that the second foot 120a, 120c whose pressure force sensors have indicated that it was not in a position of contact with the ground, and the hand 130e were in reality in proximity to the ground, the relevant proximity threshold being able to be adjusted to a value which will depend on the morphology of the robot. This threshold value may for example be from 4 to 5 cm in the case of the NAO robot whose height is of the order of 60 cm. In the case of a taller robot, this threshold value will be increased. Likewise, the dynamics of the robot's strides in terms of height (for example its ability to climb stairs) must also be taken into account. The area of this second foot is added to the previously determined support polygon to give a new support polygon 530a, 530b, 530c, termed "virtual", insofar as it is not the real polygon corresponding to physical reality at this instant.

The centers of mass 520a, 520b, 520c are henceforth situated in each case inside the virtual support polygon and the fall detection algorithm determines that there is no reason to trigger the fall management mechanism, whereas the algorithm of the prior art would have triggered it, as indicated in the commentary to FIGS. 1a to 1f.

Figure 6:
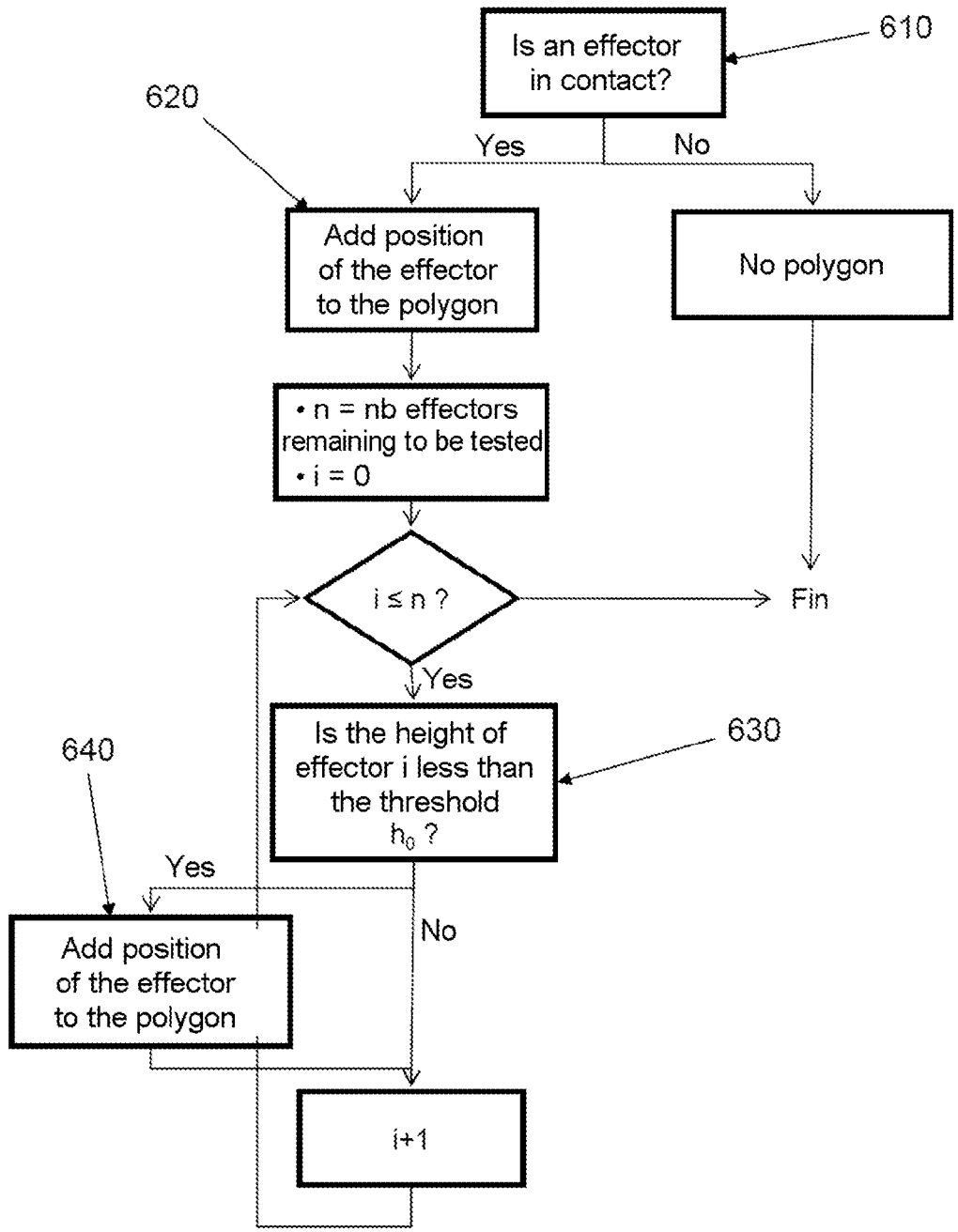
FIG. 6 is a flowchart of the processing to be implemented to determine a virtual support polygon for the robot in several embodiments of the invention.

FIG. 6 is a flowchart of the processing to be implemented to determine a virtual support polygon for the robot in several embodiments of the invention.

According to the flowchart represented in FIG. 6, it is possible to generalize the cases represented in FIGS. 5a to 5c to an arbitrary type of effector to initialize the computation of the support polygon in step 610, on condition that the position of static stability on an effector corresponds to physical reality. It is thus possible to imagine that the robot is walking on its hands, etc. The pressure force sensors 310 will make it possible to answer the question "Is an effector in contact?". These pressure force sensors may be replaced with any means of validating the contact of the effector with the surface of advancement of the robot. Once a first polygon has been computed (step 620), it is also possible to generalize the cases represented in FIGS. 5a to 5c to an arbitrary number n−1 of complementary effectors to supplement the support polygon. The other foot and the two hands are systematically tested. It is also possible to decide to add the posterior, the elbows and the shoulders. The test 630 ("Is the height of effector i less than the threshold $h_0$?" calls upon the computations by direct geometry of the position of each effector, the position found being declared close to the ground below a threshold fixed as indicated above. If the test is positive, effector i is added to the polygon (step 640). The computations continue until the preselected effectors are exhausted.

Figure 7:
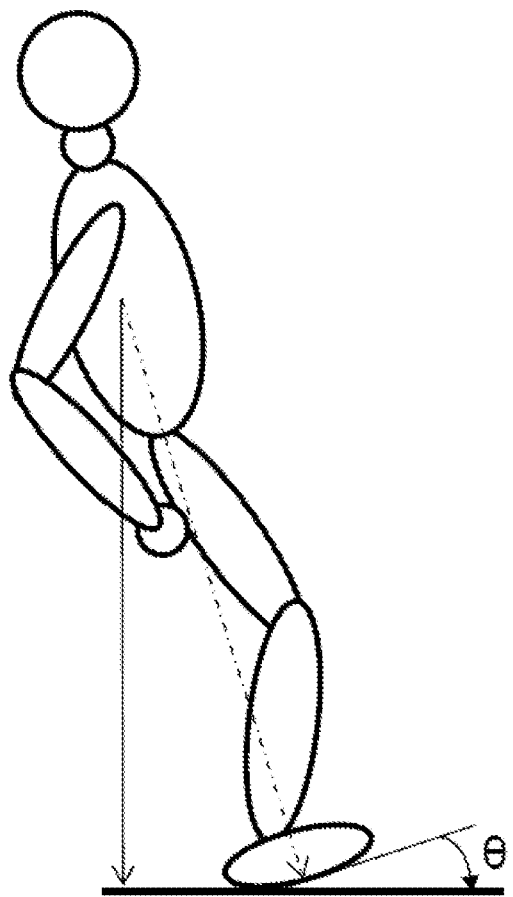
FIG. 7 illustrates the posture of a humanoid robot which must be taken into account to determine in a relevant manner the projection of the center of mass of a humanoid robot on its plane of advancement in several embodiments of the invention.

FIG. 7 illustrates a humanoid robot's posture which must be taken into account to determine in a relevant manner the projection of the center of mass of a humanoid robot on its plane of advancement in several embodiments of the invention.

It is noted in the figure that the robot's feet not being placed flat on the ground and making an angle θ with the latter, it is not possible to consider the perpendicular to the feet to be the projection of the center of mass. The robot's orientation given by the articular variables will not then be correct. It is therefore necessary to correct it. To do this the data of the inertia measurement unit will be included in the computation, as explained hereinbelow in the commentary to FIG. 8.

Figure 8:
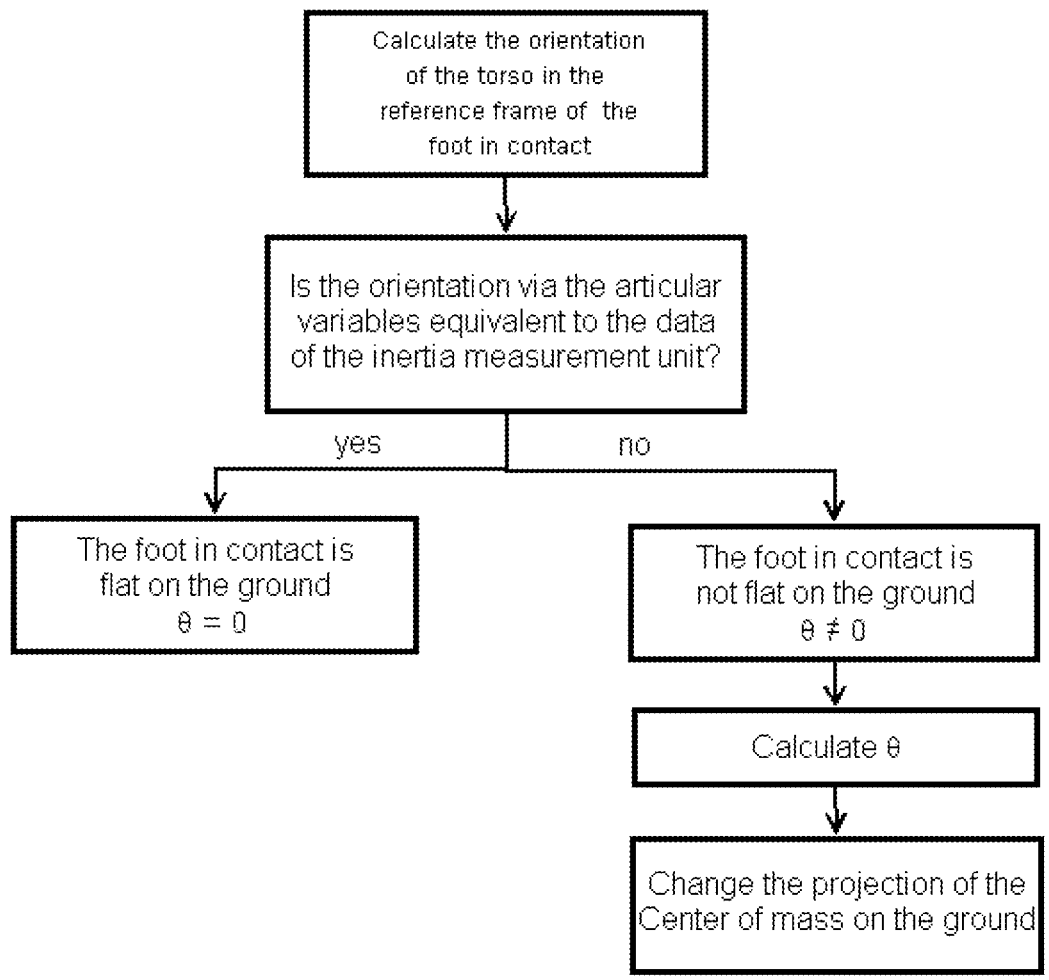
FIG. 8 is a flowchart of the processing to be implemented to determine the projection of the center of mass of a humanoid robot on its plane of advancement in several embodiments of the invention.

FIG. 8 is a flowchart of the processing to be implemented to determine the projection of the center of mass of a humanoid robot on its plane of advancement in several embodiments of the invention.

The algorithm comprises resetting the orientation of the torso on the inertia measurement unit's position measurements. The inertia measurement unit delivers two angles of rotation on the basis of the measurement of 3 accelerometers and of 2 gyroscopes. The rig is itself continuously reset. If there is an offset between the two measurements, it is concluded that the foot forms a nonzero angle θ with the ground and θ is computed, being equal to the angle made by the foot-torso axis with the vertical given by the rig.

FIGS. 9a to 9i illustrate several postures of the robot which can be filtered before detecting the conditions of realization of a fall of the robot in several embodiments of the invention.

It was seen hereinabove in the commentary to FIG. 6 that it was possible to add several effectors so as to determine the virtual support polygon corresponding best to the real posture of the robot. However, the fact of adding a high number of effectors will slow down the fall detection process. It may therefore be advantageous to carry out a prior filtering of said postures so as to extract those for which it is necessary to carry out a fall detection and those for which it is not necessary to carry out said detection. It is also possible to imagine that as a function of the posture type recognized, the effector or effectors which will be tested to perform the detection computation is or are determined.

Figure 9H:
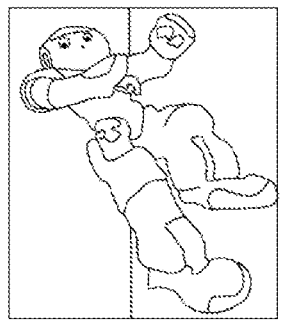
FIGS. 9a to 9i illustrate several postures of the robot which can be filtered before detecting the conditions of realization of a fall of the robot in several embodiments of the invention.
Figure 9I:
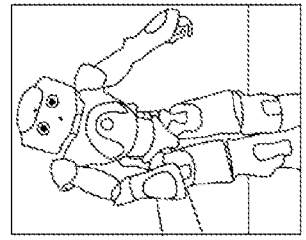
Figure 9D:
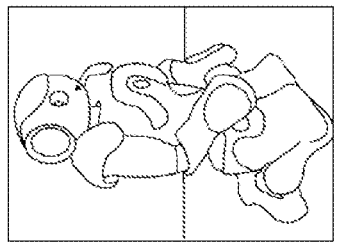
Figure 9F:
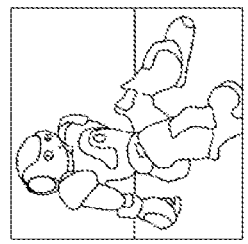
Figure 9G:
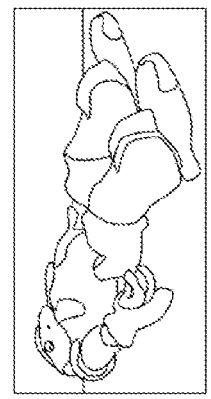
Figure 9C:
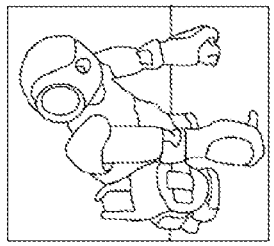
Figure 9E:
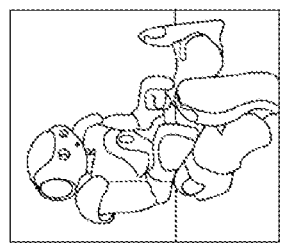
Figure 9A:
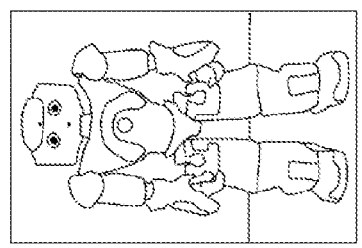
Figure 9B:
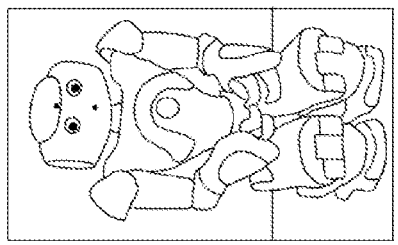

FIGS. 9a and 9b illustrate respectively the "upright" and "squatting" postures to which it is necessary to apply the fall detection mechanism.

FIGS. 9c to 9i illustrate respectively the "frog", "kneeling", "seated arms in front", "seated arms behind", "lying on its back", "lying on its side" and "unknown" postures. In posture 9i, the robot is held by a third party and none of its effectors is touching the ground. In these cases 9c to 9i, the fall detection computation is not carried out.

Figure 10:
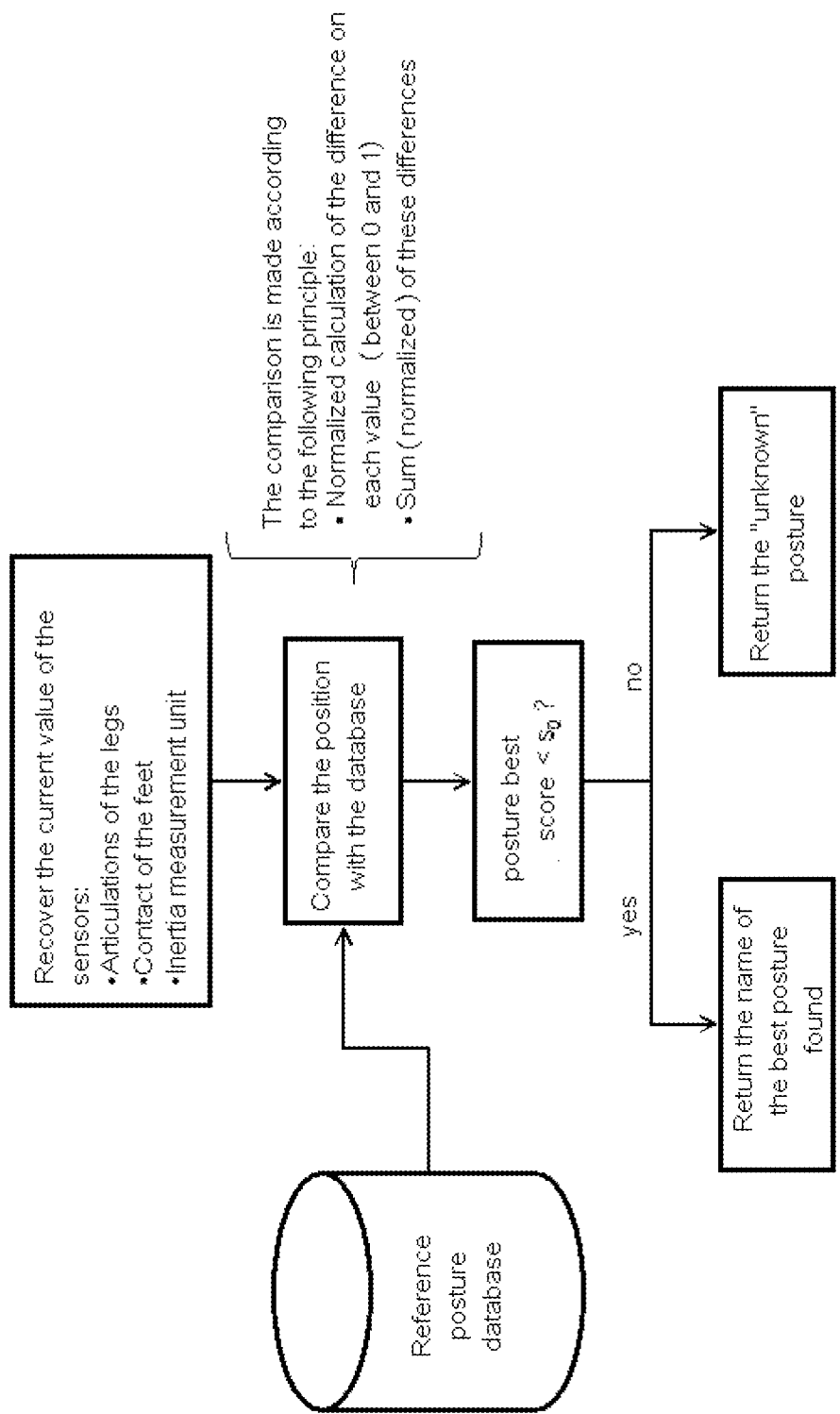
FIG. 10 is a flowchart of the processing to be implemented to characterize the robot's posture in a set of possible positions.

FIG. 10 is a flowchart of the processing to be implemented to characterize the robot's posture in a set of possible positions.

The filtering of the robot's postures is carried out by using the values of the angles of the articulations, the outputs of the feet contact sensors and the measurements of the inertia measurement unit. The data of the posture to be filtered are compared with those of the reference postures stored in a database. A distance minimization principle (for example, sum of the relative differences of each datum filtered with respect to the corresponding reference datum) is used for this comparison. The distance measurement according to this criterion is compared with a threshold fixed as a function of the number of data and as a function of the results of the experiment.

This function is implemented by the module ALRobotPose in the exemplary implementation architecture represented in FIG. 14 commented on later in the description.

Figure 11:
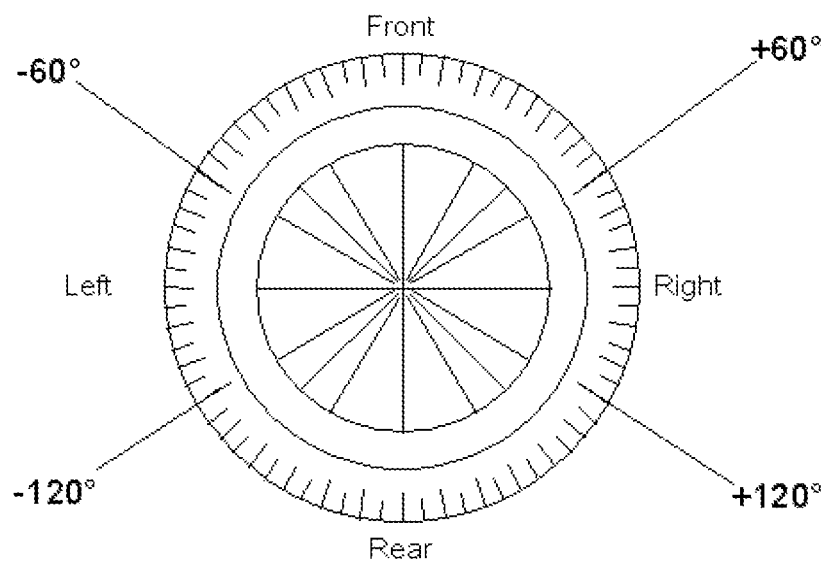
FIG. 11 is a flowchart of the processing to be implemented to manage the robot's posture so as to minimize the consequences of a fall in several embodiments of the invention.

FIG. 11 is a flowchart of the processing to be implemented to manage the robot's posture so as to minimize the consequences of a fall in several embodiments of the invention.

When a fall situation is detected by the means indicated hereinabove in the commentary to FIG. 6, means are implemented for protecting the robot's sensitive zones, notably its head, which comprises the processor and fragile sensors, and the pelvis which normally comprises complex and likewise fragile articulations.

In particular in parallel the slaving of the articulations of the legs (not those of the pelvis) will be removed and a protection movement will be performed which will depend on the fall angle determined as indicated hereinbelow in the commentary to FIG. 12. Once this protection movement has been performed, the slayings of the articulations of the arms, of the head and of the pelvis are likewise removed. It must be possible for these actions to be performed very rapidly and to constitute genuine reflexes of the robot.

Figure 12:
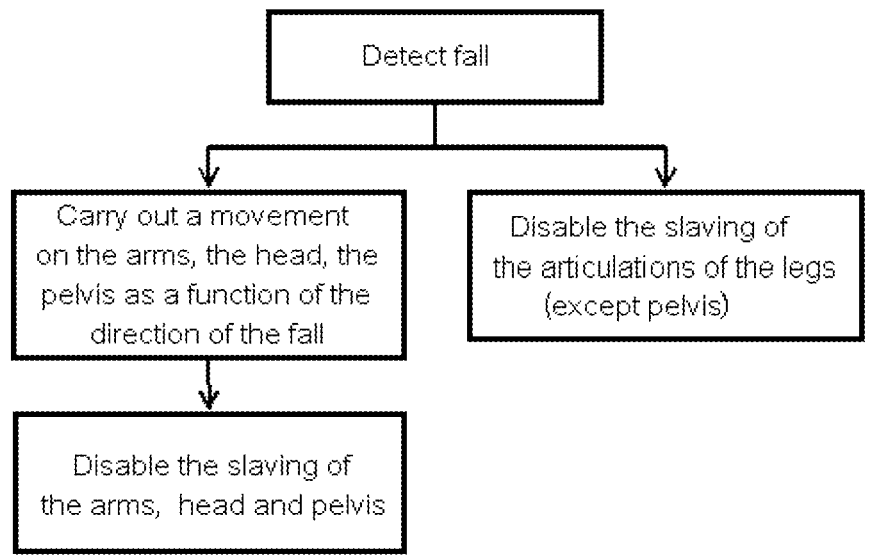
FIG. 12 illustrates the principle of determining the modalities of choosing the actions to be implemented to minimize the consequences of a fall in several embodiments of the invention.

FIG. 12 illustrates the principle of determining the modalities of choosing the actions to be implemented to minimize the consequences of a fall in several embodiments of the invention.

When a fall situation is detected by the means indicated hereinabove in the commentary to FIG. 6, the angle of the fall in the plane of the ground is determined. Accordingly, use is made of a reference frame on the ground (called SPACE_NAO). This entails a so-called egocentric reference frame which is characterized by the fact that the x axis is always oriented in the direction of the robot (forward) therefore by knowing where the center of mass of the robot exits in this reference frame, the exit angle is deduced by simple geometry. The angles are reckoned with respect to the axis of advancement of the robot, positively in the clockwise direction. Between −60° and +60°, it is considered that the fall takes place forward; between +60° and +120°, to the right; between +120° and −120°, backward; between −120° and −60°, to the left.

From the point of view of the choice of protection strategies, the right and left sectors are equivalent. Within the context of the embodiment illustrated in this figure, the angle of fall therefore makes it possible to determine three sectors which lead to the choice of three different strategies explained hereinbelow in the commentary to FIGS. 13a to 13c. It would be possible, however, to determine more than three sectors and therefore more than three protection strategies. The principle of the invention is not to seek to precisely compute a fall posture dependent on a precisely computed fall dynamics, for example by applying the model of the inverse pendulum as explained in the commentary to FIG. 2. Rather, this entails choosing between a few types of protection strategies which are defined as a function of risk classes which depend on the sensitive items of the robot and on the manner in which the direction of fall will affect them. It is noted for example that the fact of generating actions of the robot's legs, as in the prior art, may increase the impact on the ground, since the movement generates significant inertia. Thus, the disabling of the slayings of the articulations of the robot allows the robot to fall under its own weight and therefore not to increase the speed of fall and the impact.

Figure 13C:
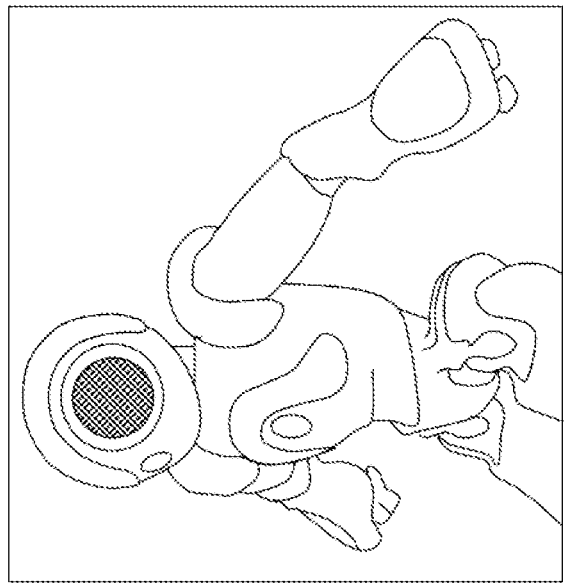
FIGS. 13a, 13b and 13c are examples of postures chosen to minimize the consequences of a fall in several embodiments of the invention.
Figure 13B:
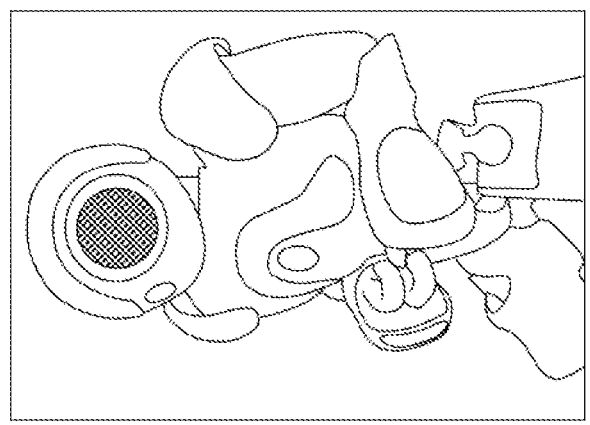
Figure 13A:
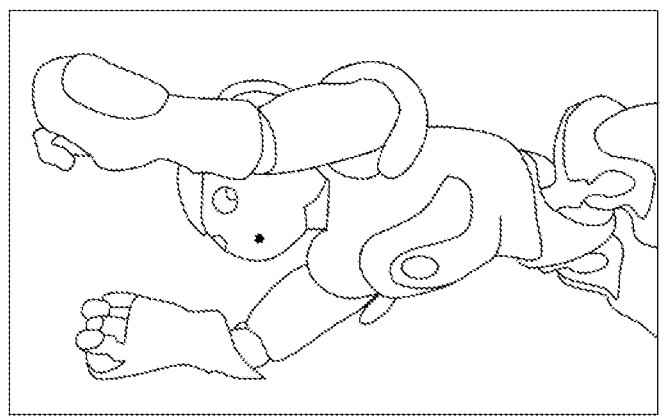

FIGS. 13a, 13b and 13c are examples of postures chosen to minimize the consequences of a fall in several embodiments of the invention.

FIG. 13a illustrates the cases of falling forward; in these cases, the protection gestures include for example in:
protecting the head by placing it rearward;
bringing the arms forward so as to damp the fall and protect the head;
closing the pelvis to group the robot's legs together.

FIG. 13b illustrates the cases of falling to the right or to the left; in these cases, the protection gestures include for example in:
protecting the head by placing it in a posture which takes account of its possible extensions, for example forward and to the right (if presence of an Ethernet cable, for example, etc.);
grouping the arms together toward the body;
opening the pelvis so as to make the robot rotate so that the first point of impact with the ground is the back and not the pelvis;

FIG. 13c illustrates the cases of falling backward; in these cases, the protection gestures include for example in:
protecting the head by placing it in a posture which takes account of its possible extensions, for example forward and to the right (if presence of an Ethernet cable, for example, etc.);
bringing the arms rearward so as to lock the robot; this movement is intended to prevent the robot from rolling on its back and from breaking its neck;
closing the pelvis to group the robot's legs together.

Figure 14:
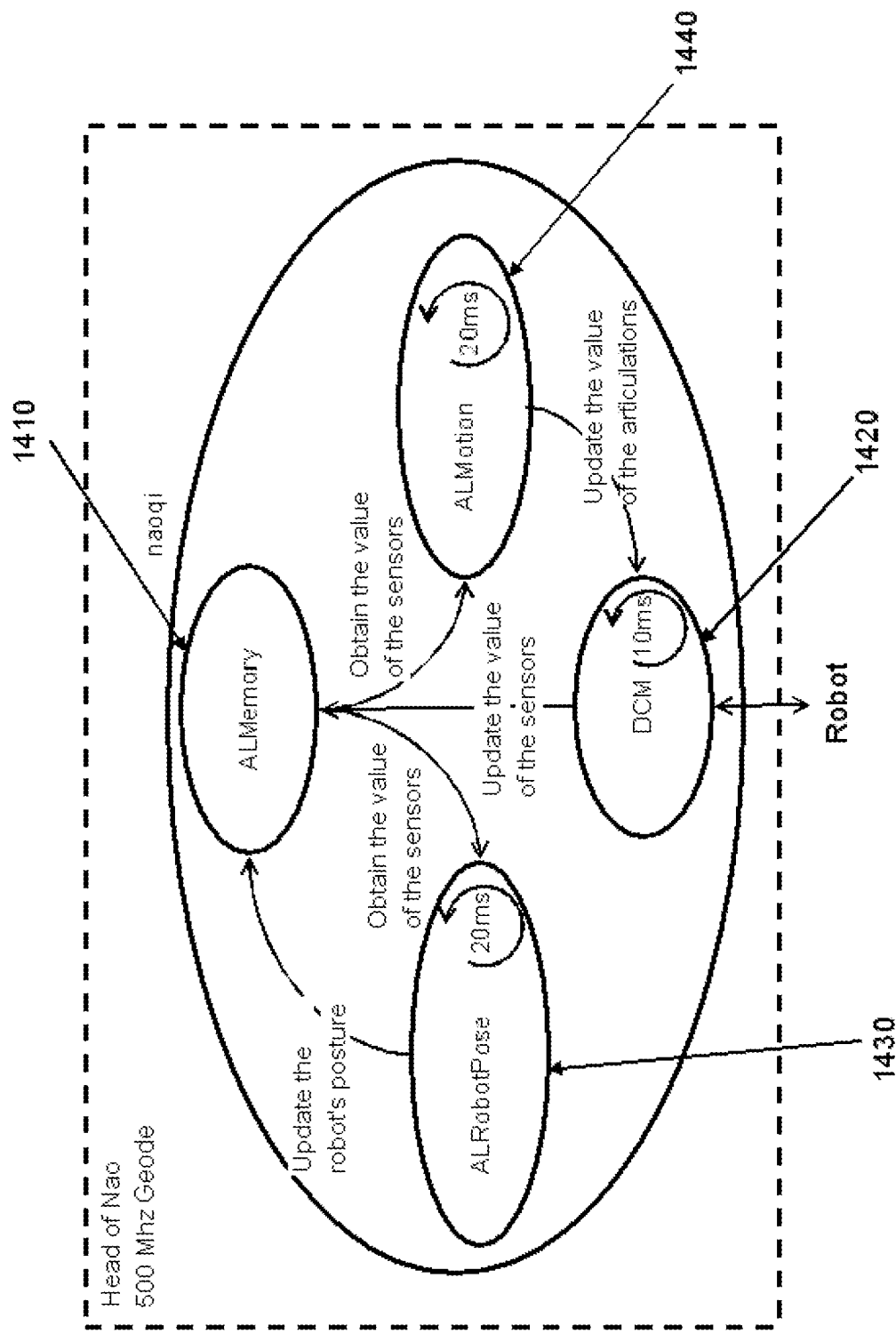
FIG. 14 is a diagram of a physical and functional architecture allowing the implementation of the invention in several of its embodiments.

FIG. 14 is a diagram of a physical and functional architecture allowing the implementation of the invention in several of its embodiments.

A robot such as NAO is advantageously endowed with high-level software allowing the piloting of the functions of the robot in an embodiment of the invention. A software architecture of this type, dubbed NAOQI, has been disclosed notably in patent application WO2009/124955 published on Oct. 15, 2009. It comprises the basic functions for managing the communications between a robot and a PC or a remote site and exchanging software which provides the software infrastructure necessary for the implementation of the present invention.

NAOQI is a framework optimized for robotic applications; it supports several languages, notably C++, Python and Urbi.

Within the context of the present invention, the following modules of NAOQI are particularly useful:
the module ALMemory, 1410, manages a memory shared between the various modules of NAOQI;
the module DCM, 1420, manages the communications with the physical robot (motors, sensors);
the module ALRobotPose, 1430, computes the current posture of the robot by comparing with the reference postures; the ALMotion module, 1440, manages the robot's movements; it is in this module that the functions for detecting and managing the falls of the present invention ("Fall manager") are embedded.

These four modules are advantageously coded in C++. The figure also indicates the data flows between modules.

In particular, the inputs necessary for the implementation of the Fall manager functions are:
the values of the sensors (feet pressure force sensors, inertia measurement unit for example);
the robot's posture.

In the case of detecting a fall, the Fall manager functions dispatch commands for updating the articulations, notably to perform the reflex protection movements and to deactivate the articulations.

Also indicated in the figure, purely by way of illustration, are values of the refresh cycles for the data processed by each module: 20 ms for the updating of the robot's posture and the fall management data; 10 ms for the values of the sensors.

The Fall Manager functions may be triggered by poor operation of certain sensors, for example the MRE sensors. In this case, erratic movements of one or more articulations will occur and if the fault causes exit of the center of mass from the virtual support polygon, placement in a protection position will be triggered. The Fall Manager therefore supplements the functions for managing the faults of the robot.

The examples described hereinabove are given by way of illustration of embodiments of the invention. They do not in any way limit the field of the invention, defined by the claims which follow.

The invention claimed is:

1. A humanoid robot configured to move on a surface comprising:
a first sensing capability configured to detect a contact of at least one first extremity of the robot with said surface,
a first processing capability configured to compute a position of a point of projection of a center of mass of said robot with respect to a first support polygon comprising said one first extremity, and
a second processing capability configured to determine a proximity of at least one second extremity of said robot with said surface,
wherein at an output of the first processing capability configured to compute the position of the point of projection of the center of mass of said robot with respect to a support polygon, a module for monitoring and initiating a group of actions for protecting against falls, at least one of said actions being triggered when the first processing capability provides at least one output characteristic of a fall state of the robot in which the point of the projection of the center of mass of the robot is outside a second support polygon, and
wherein said first processing capability is further configured to compute a position of the projection of the center of mass of said robot with respect to the second support polygon, said second polygon being deduced from the first polygon by adding to the latter points of projection on said surface of said second at least one extremity of said robot belonging to a group of extremities of said robot detected at a height less than threshold $h_0$ with said surface, at a computing cycle when the point of projection of the center of mass with respect to the first polygon is computed, the threshold $h_0$ being higher than zero, wherein an output of said computation by the first processing capability is used to trigger a fall detection if the projection of the center of mass does not fall within the first support polygon and does not fall within the second support polygon.

2. The humanoid robot of claim 1, wherein the second processing capability configured to compute the proximity of said at least one second extremity with said surface receives as an input the position of said at least one second extremity with respect to said surface, said position being provided as an output of a geometric model of the robot comprising at least the position in space of said extremity in a reference frame of the robot.

3. The humanoid robot of claim 2, wherein the condition according to which a second extremity of the robot is at a height less than threshold $h_0$ with said surface is characterized by a distance threshold chosen as a function of criteria belonging to a group of criteria comprising at least the size of the robot and the maximum swing in height of lower limbs of the robot.

4. The humanoid robot of claim 1, wherein said at least one first extremity is a foot of the robot, said foot comprising at least one pressure force sensor.

5. The humanoid robot of claim 1, wherein said at least one second extremity is a hand of the robot.

6. The humanoid robot of claim 1, further comprising, as input of the first processing capability configured to compute the position of the point of projection of the center of mass of said robot with respect to a support polygon, a module for filtering postures of the robot by comparing, according to a predefined criterion, a distance between geometric models of said postures and the geometric models of reference postures where fall detection computation is not carried out.

7. The humanoid robot of claim 1, further comprising an inertia measurement unit providing the first processing capability configured to compute the position of the point of projection of the center of mass of said robot with a vertical axis whose angle with the axis connecting the thorax and a foot of the robot in contact with the ground and with an angle of rotation to be applied to the axis of projection of the center of mass of the robot.

8. The humanoid robot of claim 1, wherein the group of actions for protecting against falls comprises at least a disabling of a slaving of articulations of legs of the robot, a placing in a posture of protection of at least one element belonging to the group comprising at least a head, arms and pelvis, and the disabling of the articulations of at least one element belonging to said group.

9. The humanoid robot of claim 1, wherein the first processing capability further provides the module for monitoring the group of actions for protecting against falls, for a state characterizing a fall state of the robot, with an angle characterizing the direction of fall in a reference frame of the robot, the value of said angle of fall with respect to chosen reference values determining the choice of the protection actions in the group of actions for protecting against falls to be executed.

10. The humanoid robot of claim 8, wherein, when an angle of fall determines a forward fall, the placing in a posture of protection of the head consists of placing the head substantially rearward, the placing in a posture of protection of the arms consists of placing the arms substantially forward to damp the forward fall and protect the head, and the placing in a posture of protection of the pelvis consists of closing the pelvis.

11. The humanoid robot of claim 8, wherein, when an angle of fall determines a fall to the left or the right, the placing in a posture of protection of the head consists of placing the head substantially forward, the placing in a posture of protection of the arms consists of grouping the arms together substantially toward the body, and the placing in a posture of protection of the pelvis consists opening the pelvis in order for a back of the robot to be a first point of contact with the ground.

12. The humanoid robot of claim 8, wherein, when the angle of fall determines a rearward fall, the placing in a posture of protection of the head consists of placing the head substantially forward, the placing in a posture of protection of the arms consists of bringing the arms substantially rearward, and the placing in a posture of protection of the pelvis consists of closing the pelvis to group the legs of the robot together.

13. A method for managing the falls of a humanoid robot capable of moving on a surface and comprising a first sensing capability configured to detect a contact of at least one first extremity of the robot with said surface, said method comprising:

computing the position of the point of projection of a center of mass of said robot with respect to a first support polygon comprising at least said at least one first extremity;

determining a proximity of at least one second extremity of said robot with said surface; and determining a position of a projection of the center of mass of said robot with respect to a second support polygon, said second polygon being deduced from the first polygon by adding to the latter points of projection on said surface of said at least one second extremity of said robot belonging to a group of extremities of said robot detected at a height less than threshold $h_0$ with said surface, the threshold $h_0$ being higher than zero, wherein an output of the computing the proximity of at least one second extremity of said robot is used to trigger a fall detection if the projection of the center of mass does not fall within the first support polygon and does not fall within the second support polygon.

14. A robotic control system comprising at least one processor and a computer program comprising program code instructions that, when executed, cause the at least one processor to execute a method for managing the falls of a humanoid robot capable of moving on a surface and comprising a first sensing capability configured to detect a contact of at least one first extremity of the robot with said surface, the method comprising:

computing the position of the point of projection of a center of mass of said robot with respect to a first support polygon comprising at least said at least one first extremity;

determining a proximity of at least one second extremity of said robot with said surface; and determining a position of a projection of the center of mass of said robot with respect to a second support polygon, wherein an output of the computing the proximity of at least one second extremity of said robot is used to trigger a fall detection if the projection of the center of mass does not fall within the first support polygon and does not fall within the second support polygon, and wherein said program code instructions being adapted for allowing the management of falls of the humanoid robot, said program code instructions comprising a first processing capability configured to compute the position of the point of projection of the center of mass of said robot with respect to the first support polygon, said program code instructions further comprising a second processing capability for detection data of the proximity of the at least one second extremity of said robot with said surface and a module for computing the position of projection of the center of mass of said robot with respect to said second support polygon, said second polygon being deduced from the first polygon by adding to the latter points of projection on said surface of said at least one second extremity of said robot belonging to a group of extremities of said robot detected at a height less than threshold $h_0$ with said surface.

15. The humanoid robot of claim 1, wherein said second at least one extremity is at a height less than threshold $h_0$ with said surface, and said second at least one extremity is not in contact with said surface.

\* \* \* \* \*